United States Patent [19]
Freriks et al.

[11] Patent Number: 5,480,960
[45] Date of Patent: Jan. 2, 1996

[54] PROCESS FOR THE PREPARATION OF AN ACID FUNCTIONAL POLYESTER RESIN

[75] Inventors: Jan Freriks; Pieter Groenveld; Petrus G. Kooijmans; Werner T. Raudenbush, all of Amsterdam, Netherlands

[73] Assignee: Shell Oil Company, Houston, Tex.

[21] Appl. No.: 274,949

[22] Filed: Jul. 14, 1994

[30] Foreign Application Priority Data

Jul. 15, 1993 [EP] European Pat. Off. ............. 93202081

[51] Int. Cl.⁶ .................................................... C08G 63/02
[52] U.S. Cl. .................... 528/198; 528/196; 528/297; 528/335; 528/361; 528/363
[58] Field of Search .................... 528/196, 198, 528/335, 297, 361, 363

[56] References Cited

U.S. PATENT DOCUMENTS

| | | | |
|---|---|---|---|
| 3,404,018 | 10/1968 | Hicks | 106/252 |
| 3,651,098 | 3/1972 | Heer et al. | 260/348 |
| 4,097,466 | 6/1978 | Berger | 260/75 EP |
| 4,997,907 | 3/1991 | Marten et al. | 528/272 |
| 5,138,078 | 8/1992 | Brytus | 528/361 |

FOREIGN PATENT DOCUMENTS 0447360  9/1991  European Pat. Off. .

OTHER PUBLICATIONS

Post Jr., Robert L., The Origin of Homeostasis in the Early Earth, J. Mol. Evol. (1990) 31:257–264.

*Primary Examiner*—James J. Seidleck
*Assistant Examiner*—John M. Cooney, Jr.

[57] ABSTRACT

A process for the preparation of a linear tertiary aliphatic carboxyl functional polyester resin by reacting a) at least one compound A' comprising one monofunctional primary- or secondary hydroxyl group and/or at least one compound A" comprising one primary- or secondary hydroxyl group and one tertiary aliphatic carboxyl group and b) at least one aromatic or cycloaliphatic dicarboxylic acid compound B comprising two aromatic- or secondary aliphatic carboxyl groups or the anhydride thereof and c) at least one diol compound C comprising two aliphatic hydroxyl groups which may each independently be a primary or a secondary hydroxyl group and d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being M:N:X+Y+1:X:Y, wherein M+N=2

X ranges from 2 to 8 and

Y ranges from 2–N to 8, at a temperature of from 100° to 240° C., until essentially all the nontertiary carboxyl groups as initially present in the reaction mixture have been reacted.

15 Claims, No Drawings

5,480,960

PROCESS FOR THE PREPARATION OF AN ACID FUNCTIONAL POLYESTER RESIN

BACKGROUND OF THE INVENTION

The present invention relates to a process for the preparation of a linear tertiary aliphatic carboxyl functional polyester resin, to a linear tertiary aliphatic carboxyl functional polyester resin obtainable by said process, to a polyglycidylester resin obtainable by glycidating said linear tertiary aliphatic carboxyl functional polyester resin and to powder coating compositions comprising said linear tertiary aliphatic carboxyl functional polyester resin or said polyglycidylester resin.

Powder coating compositions based on the solid reaction products of 2,2-bis-(4-hydroxyphenyl)propane and epichlorohydrin have been known for a long time. However, they show only minor ultraviolet resistance and are therefore not suitable for applications requiring a high outdoor durability such as automotive topcoats.

Triglycidylesters which can be used in outdoor durable coatings and in casting compositions are disclosed in U.S. Pat. No. 5,138,078. Due to the secondary nature of the terminal carboxyl functions present in the tricarboxylic acid adduct precursors, strongly alkaline conditions should be avoided during glycidation of these tricarboxylic acid adducts. As a result the triglycidylester produced will contain a relatively high level of hydrolyzable chlorine. In example 2 of U.S. Pat. No. 5,138,078 which relates to the glycidation of the 2:1 adduct of hexahydrophthalic anhydride and dimethylolpropionic acid, the product obtained has a chlorine content of 1.5%. Such a high level of residual chlorine is generally undesirable in coating compositions. In addition, the triglycidylesters reported in U.S. Pat. No. 5,138,078 are liquid, they can not be applied in powder coating compositions.

The most commonly used system for outdoor durable powder coatings are polyester/triglycidylisocyanurate (TGIC). For health and safety reasons however the use of TGIC is not desirable. TGIC is relatively toxic (Rat Oral $LD_{50}$ of 0.4 g/kg) and is mutagenic according to the Ames Mutagenicity Test.

Therefore, there is a need for resin systems which are particularly suitable for use in powder coating compositions which are relatively nontoxic as compared to the current polyester/TGIC systems and show excellent outdoor durability in the cured state.

Therefore it is an object of the invention to provide a process for the preparation of a linear acid functional polyester resin containing only tertiary aliphatic carboxylic acid functionality, and/or a polyglycidylester resin thereof suitable for use in outdoor durable powder coating compositions which are relatively environmentally friendly.

SUMMARY OF THE INVENTION

Accordingly a process for the preparation of a linear tertiary aliphatic carboxyl functional polyester resin is provided, comprising reacting a) at least one alcohol compound A' comprising one monofunctional primary- or secondary hydroxyl group and/or at least one alcohol compound A" comprising one primary- or secondary hydroxyl group and one tertiary aliphatic carboxyl group and b) at least one aromatic or cycloaliphatic dicarboxylic acid compound B comprising two aromatic- or secondary aliphatic carboxyl groups or an anhydride thereof and c) at least one diol compound C comprising two aliphatic hydroxyl groups which may each independently be a primary or a secondary hydroxyl group and d) at least one dihydroxymonocarboxylic acid compound D comprising a tertiary aliphatic carboxyl group and two aliphatic hydroxyl groups, which may each independently be primary or secondary hydroxyl, the molar ratio of compounds A':A":B:C:D being M:N:X+Y+1: X:Y, wherein M+N=2, X ranges from 2 to 8, and Y ranges from 2–N to 8.

at a temperature within the range from about 100° to about 240° C. The reaction is continued until essentially all the nontertiary carboxyl groups initially present in the reaction mixture have been reacted.

DETAILED DESCRIPTION OF THE INVENTION

It has been found that the linear tertiary aliphatic carboxyl functional polyester resin produced according to the process of the invention is essentially free from nontertiary carboxyl groups when it has an acid value which substantially corresponds to the theoretical acid value calculated on the basis of the amount of tertiary carboxyl groups of the reactants as initially present in the reaction mixture. The term "substantially" is used herein to indicate a deviation from the theoretical value of +/–5% at most. This is determined by standard alkali metric titration.

For those skilled in the art it can be appreciated that the molecular weight distribution and number average molecular weight of the resin produced will depend on the specific reactants and the ratios applied in the process of the invention. Whilst the tertiary aliphatic carboxyl groups present in compounds A" and D practically do not react under the esterification conditions employed, glycidation of these tertiary aliphatic carboxyl groups with epihalohydrin can be performed under standard alkaline conditions whereby a polyglycidylester resin can be obtained which contains a low hydrolyzable halogen content, usually lower than about 0.5% by weight based on the total weight of the composition.

The process of the present invention may be carried out according to conventional esterification methods, preferably by azeotropic condensation. In particular, the condensation is carried out by charging the compounds A to D simultaneously to the reactor whereafter the temperature is increased from room temperature to from about 200° to about 220° C. during a period of about 6 to about 8 hours, thus allowing the reaction to initiate and to proceed under continuous azeotropic removal of water. Generally the azeotropic removal of water is continued until a reaction product is obtained which has an acid value corresponding to the theoretical acid value as referred to above. An esterification catalyst known in the art, such as for example dibutyltinoxide, paratoluenesulfonic acid, tinoctoate, zincoctoate and lithiumricinoleate may be used in the esterification process.

Preferable alcohol compounds A' for use in the process of the present invention are aliphatic and cycloaliphatic alcohols having one primary or one secondary hydroxyl group and having of from 1 to 6 carbon atoms, such as for example methanol, isopropanol, neopentanol, 2-butanol and cyclohexanol. Suitable alcohol compounds A" are aliphatic and cycloaliphatic alcohols having one primary or one secondary hydroxyl group and having of from 1 to 6 carbon atoms and having in addition one tertiary aliphatic carboxyl group such as for example cyclohexane-1-methyl-4-hydroxy carboxylic acid and hydroxypivalic acid. Hydroxypivalic acid is a particularly preferred compound A".

Preferable compounds B for use in the process of the present invention are for example phthalic acid (PA), tetrahydrophthalic acid, hexahydrophthalic acid (HHPA), methylhexahydrophthalic acid, terephthalic acid, isophthalic acid, endomethylenetetrahydrophthalic acid, methylendomethylenetetrahydrophthalic acid, 1,4-cyclohexanedicarboxylic acid and 1,3-cyclohexanedicarboxylic acid or combinations thereof; HHPA being particularly preferred.

Preferable compounds C for use in the process of the present invention include branched aliphatic-, cycloaliphatic-, or araliphatic compounds, containing two aliphatic hydroxyl groups, each individually being either a primary or a secondary hydroxyl group, such as for example propylene glycol, neopentylglycol, hydrogenated diphenylolpropane (HDPP), hydrogenated 4,4'-dihydroxydiphenyl, 1,4-cyclohexanedimethylol, 1,4-dihydroxycyclohexane, hydroxypivalylhydroxypivalate and 2-butyl-2-ethyl-1,3-propanediol or mixtures thereof; HDPP being particularly preferred. A typical example of a suitable compound D for use in the process of the present invention is dimethylolpropionic acid.

It has been found that the linear tertiary aliphatic carboxyl functional polyester resin obtainable according to the process of the present invention can be easily converted to a polyglycidylester resin according to methods known in the art i.e. by reaction with an excess epihalohydrin in the presence of a suitable base and catalyst. Most conveniently epichlorohydrin is being used.

The linear tertiary aliphatic carboxyl functional polyester resin and the polyglycidylester resin of the invention are both suitable for use in powder coating compositions, which in the cured state show good outdoor durability. Moreover in view of the polymeric nature of the polyglycidylester resin of the invention a lower level of toxicity as compared to TGIC is foreseen and therefore they can advantageously be used as an alternative to TGIC in powder coatings. It has been found that those polyglycidylester resins derived from the linear tertiary aliphatic carboxyl functional polyester resins obtained by the process of the invention where X is within the range from 3 to 6, more preferably 6, and Y is within the range from 2 to 4, more preferably 2, are particularly suitable for use in outdoor durable powder coating compositions.

The curable powder coating compositions of the invention may be prepared by addition of a cross-linking resin to either the linear tertiary aliphatic carboxyl functional polyester resin obtainable by the process of the present invention or to the polyglycidylester resin obtainable by glycidating said linear tertiary aliphatic carboxyl functional polyester resin. The amount of cross-linking compound used in the powder coating compositions of the invention will normally be such so as to provide about equal amounts of reactive groups of the cross-linking compound and of the tertiary aliphatic carboxyl groups present in the linear tertiary aliphatic carboxyl functional polyester resin or of the epoxy groups present in the polyglycidylester resin.

Preferable cross-linking resins for use in combination with the linear tertiary aliphatic carboxyl functional polyester resins of the present invention are for example outdoor durable epoxy resins, such as for example the diglycidylester of terephthalic acid, the polyglycidylester resins according to the present invention, the diglycidylesters of alpha, alpha'-dibranched dicarboxylic acids as disclosed in European Patent Application publication number 518,408 and the polyglycidylesters based on polycarboxylic acids carrying two alkyl substituents on each of the alpha carbon atoms as disclosed in European patent application publication number 366,205.

Preferable cross-linking resins for use in combination with the polyglycidylester resins of the present invention are for example the (corresponding) acid functional polyester resin of the present invention; solid polyacids such a sebacic acid, adipic acid, 1,12-dodecanedioic acid; anhydrides such as polyazeleic polyanhydride and trimellitic anhydride; acid functional polyesters such as the reaction product of one mole of trimethylopropane and 3 moles of hexahydrophtalic anhydride, the reaction product of 1-hexanediol with a molar excess of 1,12-dodecanedioic acid and the reaction product of one mole of hexamethoxymethylmelamine and 3 moles of hydroxypivalic acid; cyanuric acid; and solid basic curing agents such as dicyandiamide and $BF_3$-complexes.

The powder coating compositions of the present invention may further comprise a catalyst and optionally other additives, as known in the art to be suitable for use in powder coating compositions.

Suitable catalyst are for example quaternary ammonium and phosphonium salts: metal salts/compounds such as for example stannous(II)octoate; basic compounds such as for example the imidazoles; and tertiary amines such as for example diazabicycloundecene.

The catalyst is typically present in an amount of from about 0.1 to about 2% by weight based on the weight of the total powder coating composition.

Suitable cure times and cure temperatures of the powder coating compositions of the invention are those conventionally applied in connection with powder coating systems.

The invention is illustrated by the following examples.

EXAMPLE 1

Preparation of linear tertiary aliphatic carboxyl functional polyesters 1 to 5 according to the invention.

Compounds A to D were charged in molar amounts as indicated in table 1 in a roundbottom glass reactor, equipped with Dean & Stark Trap with reflux-condenser, temperature control, nitrogen inlet and stirrer.

The mixture was then heated to 150° C. in 30 minutes and xylene was added (5% weight on the total weight of the reaction mixture). The temperature of the reaction mixture was increased in two hours to 210° C. and kept at 210° C. until the theoretical acid value as referred to above was reached. The acid functional polyester thus formed was discharged and allowed to cool down to room temperature.

TABLE 1[1,2]

| Linear acid functional polyester resin | 1 | 2 | 3 | 4 | 5 |
| --- | --- | --- | --- | --- | --- |
| HPA (A) | 2 | 2 | 2 | 2 | 2 |
| HHPA (B) | 9 | 6 | 4 | — | 11 |
| DMPA (D) | 2 | 1 | — | 2 | 4 |
| HDPP (C) | 6 | 4 | 3 | 6 | 6 |
| PA (B) | — | — | — | 9 | — |

[1]Numbers given represent the amount of moles of a particular compound charged to the reactor in the process of Example 1 for the preparation of the linear tertiary carboxy functional polyester resins 1 to 5.
[2]The chemical compounds represented by the abbreviations used are:

TABLE 1[12]-continued

| Linear acid functional polyester resin | 1 | 2 | 3 | 4 | 5 |
|---|---|---|---|---|---|

HPA: hydroxypivalic acid
HHPA: hexahydrophthalic anhydride
DMPA: dimethylolpropionic acid
HDPP: hydrogenated diphenylolpropane
PA: phthalic anhydride

EXAMPLE 2

Preparation of polyglycidylester resins I to V.

An amount equaling 1 carboxyl group equivalent of a linear tertiary aliphatic carboxyl functional polyester resin 1 to 5 as prepared in example 1 was dissolved in 8 moles epichlorohydrin (ECH) and isopropyl alcohol (IPA). The solution was charged to a 3 liter glass-reactor equipped with a temperature control, stirrer and reflux condenser. Next the temperature was raised to 70° C., followed by the gradual addition of an aqueous solution of 1.2 moles NaOH over a period of time of 60 minutes. After an additional reaction period of 10 minutes the reactor content was allowed to settle and the aqueous phase was separated from the organic phase.

The organic phase was vacuum flashed to remove water, IPA and ECH.

The resulting product was dissolved in toluene and the organic phase was washed three times with water whereafter the organic phase was vacuum flashed to remove toluene. The glycidylester thus obtained was discharged and allowed to cool down. Characteristics of the solid polyglycidylester resins prepared are presented in Table 2.

TABLE 2

| Resin Characteristics Acid-functional polyester resin[1] | 1 | 2 | 3 | 4 | 5 |
|---|---|---|---|---|---|
| Acid value (mmol/kg) | | | | | |
| Found | 1200 | 1320 | 1280 | 1250 | 1550 |
| Theoretical | 1200 | 1330 | 1260 | 1280 | 1550 |
| Softening point[2] (°C.) | 115–125 | 95–110 | 90–105 | 130–140 | 105–119 |
| Polyglycidylester resin[3] | I | II | III | IV | V |
| EGC (mmol/kg) | 1000 | 970 | 1020 | 1000 | 1180 |
| Softening point[2] (°C.) | 85–90 | 75–85 | 75–85 | 90–95 | 60–76 |
| Hydrolyzable chlorine content[4] (% w) | <0.32 | <0.35 | <0.5 | <0.5 | <0.5 |

[1]Prepared as described in Example 1.
[2]The softening point was determined using a Kofler Bench.
[3]Prepared as described in Example 2.
[4]% weight of hydrolyzable chlorine based on the total weight of the composition.

We claim:

1. A process for the preparation of a linear tertiary aliphatic carboxyl functional polyester resin comprising reacting, in a reactor, a) at least one compound A' comprising one monofunctional primary- or secondary hydroxyl group and/or at least one compound A" comprising one primary- or secondary hydroxyl group and one tertiary aliphatic carboxyl group and b) at least one aromatic or cycloaliphatic dicarboxylic acid compound B comprising two aromatic- or secondary aliphatic carboxyl groups or the anhydride thereof and c) at least one diol compound C comprising two aliphatic hydroxyl groups wherein each is independently a primary or a secondary hydroxyl group and d) at least one dihydroxymonocarboxylic acid compound D comprising a tertiary aliphatic carboxyl group and two aliphatic hydroxyl groups, wherein each is independently a primary or secondary hydroxyl group, the molar ratio of compounds A':A":B:C:D being M:N:X+Y+1:X:Y, wherein M+N=2, X ranges from 2 to 8, and Y ranges from 2–N to 8, at a temperature within the range of from about 100° to about 240° C., until essentially all of the nontertiary carboxyl groups as initially present in the reaction mixture have been reacted.

2. The process of claim 1 wherein the reaction is carried out under continuous azeotropic removal of water.

3. The process of claim 1 wherein the reactants A', A", B, C and D are reacted in the presence of an esterification catalyst.

4. The process of claim 1 wherein reactant A" is hydroxypivalic acid.

5. The process of claim 1 wherein reactant B is hexahydrophthalic acid.

6. The process of claim 1 wherein reactant C is hydrogenated diphenylolpropane.

7. The process of claim 1 wherein reactant D is dimethylolpropionic acid.

8. The process of claim 1 wherein x is within the range of 3 to 6 and y is within the range of 2 to 4.

9. A linear tertiary aliphatic carboxyl functional polyester resin produced by the process of claim 1.

10. A linear tertiary aliphatic carboyl functional polyester resin produced by the process of claim 8.

11. A polyglycidylester resin produced by reacting a linear tertiary aliphatic carboxyl functional polyester resin produced by a process comprising reacting a) at least one compound A' comprising one monofunctional primary- or secondary hydroxyl group and/or at least one compound A" comprising one primary- or secondary hydroxyl group and one tertiary aliphatic carboxyl group and b) at least one aromatic or cycloaliphatic dicarboxylic acid compound B comprising two aromatic- or secondary aliphatic carboxyl groups or the anhydride thereof and c) at least one diol compound C comprising two aliphatic hydroxyl groups wherein each independently is a primary or a secondary hydroxyl group and d) at least one dihydroxymonocarboxylic acid compound D comprising a tertiary aliphatic carboxyl group and two aliphatic hydroxyl groups wherein each independently is primary or secondary hydroxyl, the molar ratio of compounds A':A":B:C:D being M:N:X+Y+1:X:Y, wherein M+N=2

X ranges from 2 to 8 and

Y ranges from 2–N to 8, at a temperature within the range of from about 100° to about 240° C., until essentially all of the nontertiary carboxyl groups as initially present in the reaction mixture have been reacted, with an excess epihalohydrin in the presence of a suitable base and catalyst.

12. A polyglycidylester resin as claimed in claim 11 wherein the epihalohydrin used is epichlorohydrin.

13. A powder coating composition comprising a linear tertiary aliphatic carboxyl functional polyester resin of claim 9 and a cross-linking agent.

14. A powder coating composition comprising a polyglycidylester resin of claim 11 and a cross-linking agent.

15. A polyglycidylester resin of claim 11 having a hydrolyzable halogen content of less than about 0.5% by weight based on the total weight of the polyglycidylester resin.

* * * * *